Dec. 11, 1962   F. THOMAS ETAL   3,067,857
CHARGING DEVICE FOR SINTERING BANDS
Filed March 29, 1960   2 Sheets-Sheet 1
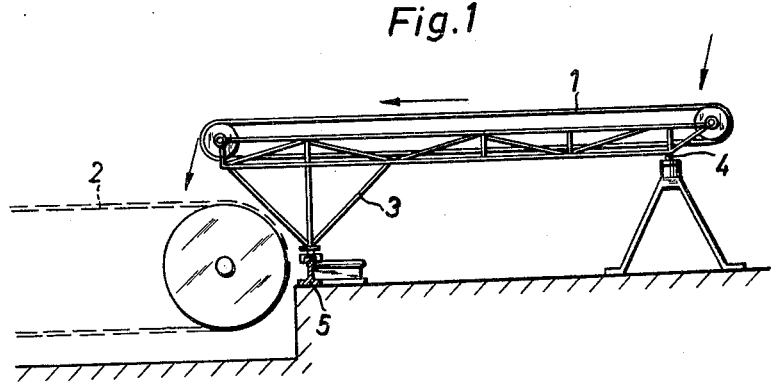
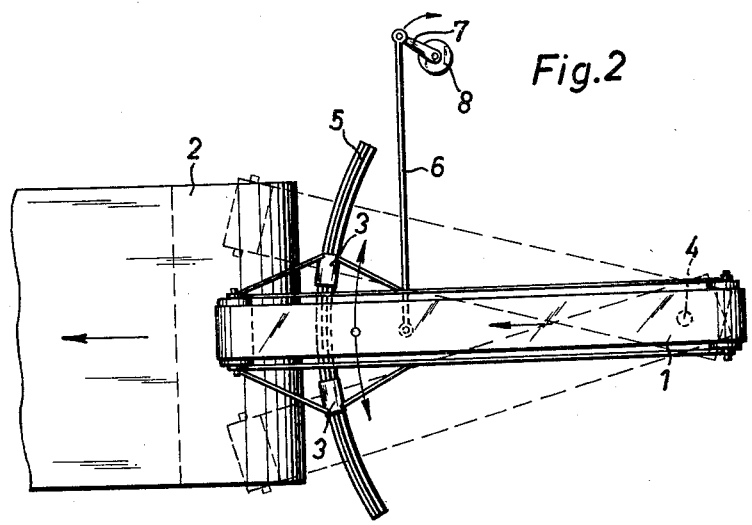
INVENTORS
FRIEDRICH THOMAS,
FRANZ RODIS AND
ARNULF HINZ
BY
Connolly and Hutz
ATTORNEYS Dec. 11, 1962   F. THOMAS ETAL   3,067,857
CHARGING DEVICE FOR SINTERING BANDS
Filed March 29, 1960   2 Sheets-Sheet 2
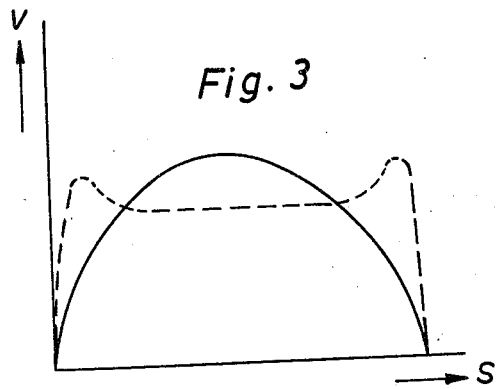
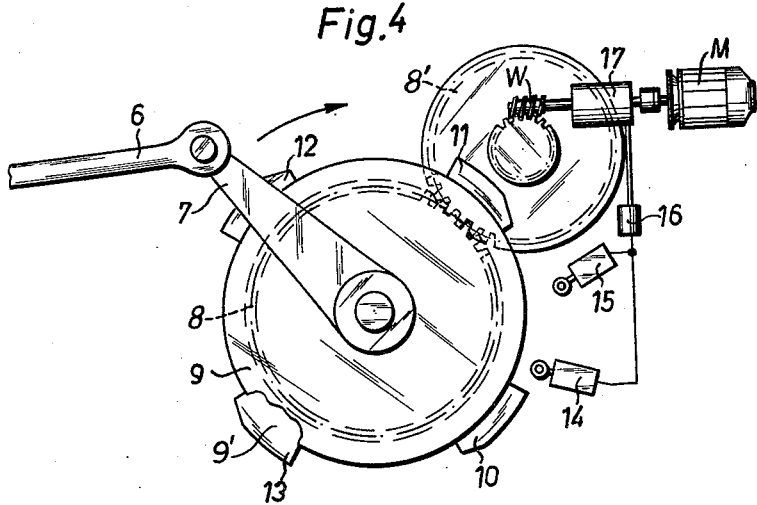
INVENTORS
FRIEDRICH THOMAS,
FRANZ RODIS AND
ARNULF HINZ
BY
*Connolly and Hutz*
ATTORNEYS

3,067,857
CHARGING DEVICE FOR SINTERING BANDS
Friedrich Thomas, Hermulheim, near Koln, and Franz Rodis and Arnulf Hinz, Knapsack, near Koln, Germany, assignors to Knapsack-Griesheim Aktiengesellschaft, Knapsack, near Koln, Germany, a corporation of Germany
Filed Mar. 29, 1960, Ser. No. 18,381
Claims priority, application Germany Apr. 2, 1959
2 Claims. (Cl. 198—112)

The present invention relates to a charging device for sintering bands or belts and the like with adjustable charging means for regulating the height of the distribution of the material on the belt by the use of a feed conveyor belt having a periodically and horizontally reciprocating motion and an approximately uniform conveying speed. The angular velocity of the periodical swinging motion of the feed conveyor belt is variable under a law of motion which can be adjusted in accordance with the desired charging height distribution so that said distribution over the width of the sintering band complies with the requirements in each case.

Devices are known that strive for a quite uniform distribution of the feed material on a sintering band with the aid of a feed conveyor having a periodically reciprocating motion. Since, however, the angular velocity of the swinging motion of the conveyor is non uniform on account of the crank gears generally used and the reversal of the direction of motion at both dead centers, a uniform charging height over the whole width of the sintering band cannot be reached. A uniform charging height can be obtained, however, by varying the law of motion of the periodically and horizontally reciprocating motion in accordance with the desired charging height distribution over the width of the sintering band.

According to the present invention the angular velocity of the periodically reciprocating motion of the feed conveyor is varied in accordance with a law of motion depending on the desired charging height distribution by means of a speed-reducer drive having a periodically variable reduction ratio and being arranged between the uniformly running driving motor and the crank shaft of the charging device.

According to a further feature of the invention movable pilot cams are arranged on the crank shaft for the periodically variable adjustment of the reduction ratio of the regulating gear; the cams actuate, on each rotation of the crank shaft, stationary switching elements which, on their part, act on the regulating member that varies the reduction ratio of the speed-reducer drive.

The accompanying drawings diagrammatically illustrate a charging device of the invention with periodically reciprocating motion of the feed conveyor.

FIGURE 1 is a side view of the charging and conveying apparatus;

FIGURE 2 is a top view of the apparatus of FIGURE 1;

FIGURE 3 is a diagram illustrating the law of motion relating to the apparatus of FIGURES 1 and 2; and FIGURE 4 is a detail on an enlargd scale of a portion of the apparatus of FIGURES 1 and 2.

An endless feed conveyor belt 1 transports the loose material uniformly in the direction of the arrow onto an endless sintering belt 2 lying below and adjacent the discharge end of the belt 1. The feed conveyor belt 1 is fixed on a carriage 3 which moves in reciprocating manner on an arc shaped guide rail 5 around pivot attachment 4 for the carriage 3. By connecting rod 6 the carriage 3 is connected with crank shaft 7 of gear 8. In known devices the crank shaft 7 rotates with constant velocity while in the charging device of the invention the crank shaft 7 follows a variable and adjustable law of motion with a non-uniform velocity.

In FIGURE 3 the linear velocity $v$ of a point of the feed conveyor line set in motion with a uniformly constant velocity driving crank 7 is traced as ordinate and $s$ or the angle at the center as abscissa. To a first approximation the solid curve is obtained showing that a uniform charging height cannot be reached. A satisfactorily uniform charging height can be obtained, however, when the function curve of $s$ approximately takes the course of the broken line.

FIGURE 4 illustrates how this variation of the law of motion can be brought about according to the present invention. A rotatable disc 9 is connected with fixed crankshaft 7 which is, in turn, pivotably connected with connecting rod 6 which pivots the carriage 3, cams 10 and 12 are supported by the disc and extend beyond the disc periphery to periodically actuate the adjacent switch 14 during operation when the disc is rotating.

A second disc 9', on which the control cams 11 and 13 are supported, is arranged behind the first disc 9 and is also connected in fixed relationship with crankshaft 7. The control cams 11 and 13 periodically actuate switch 15.

The gear wheel 8 is connected in fixed manner with the crank shaft 7 and it is rotated by gear wheel 8' in turn operated by worm gear W from drive motor M.

The switches 14 and 15 operate the adjusting member, for example the adjusting motor 16, of the speed-reducer drive 17 in the desired sense. By operating the one switch the drift speed of the speed-reducer drive 17 is increased and by operating the other switch said speed is reduced. The particulars of the switching mechanism belong to the state of the art.

The number of the control cams is not limited to 4 and their respective positions are not restricted to those represented in FIGURE 4, but depend only on the desired law of motion in each case. It is necessary, of course, to take the mechanical and electrical conditions into consideration.

The use of the device according to the invention is particularly advantageous in the case of granulated material having a very insignificant stability prior to sintering and, therefore, must be charged as carefully as possible and in uniform height to the sinterig band.

With the use of the charging device of the invention the abrasion is immaterial and, furthermore, a uniform permeability of the sintering bed and consequently a uniform heating of the granulated material on the sintering band are achieved.

We claim:
1. In combination, a charging device for a preselected distribution of materials on sintering belts comprising an endless conveyor belt with the receiving end being pivotally connected to a stationary support, a carriage for supporting the belt, reciprocating means connected with the carriage for moving the delivery end of said conveyor belt back-and-forth transversely on an arc-curved path in a substantial horizontal place, a constant-speed motor, speed reducing drive means connected with the constant-speed motor, gear means connected with the speed-reducing drive means, drive means connected with the gear means and the reciprocating means connected with the carriage, a control motor connected to the speed-reducing drive means for varying the speed of the speed reducing motor, electric switch units for varying the control of the control motor, and means connected with the gear means for actuating in intermittent manner the electric switches.

2. The combination of claim 1 wherein the means for actuating the electric switches are adjustable cams connected with the gear means.

References Cited in the file of this patent
UNITED STATES PATENTS

| | | |
|---|---|---|
| 2,515,165 | Siems | July 11, 1950 |
| 2,627,334 | Koppel et al. | Feb. 3, 1953 |
| 2,649,185 | Lichtenberg | Aug. 18, 1953 |
| 2,834,484 | De Vaney | May 13, 1958 |